F. F. FOWLE.
TURBINE MOTOR.
APPLICATION FILED AUG. 17, 1918.
1,433,995.
Patented Oct. 31, 1922.
2 SHEETS—SHEET 1.
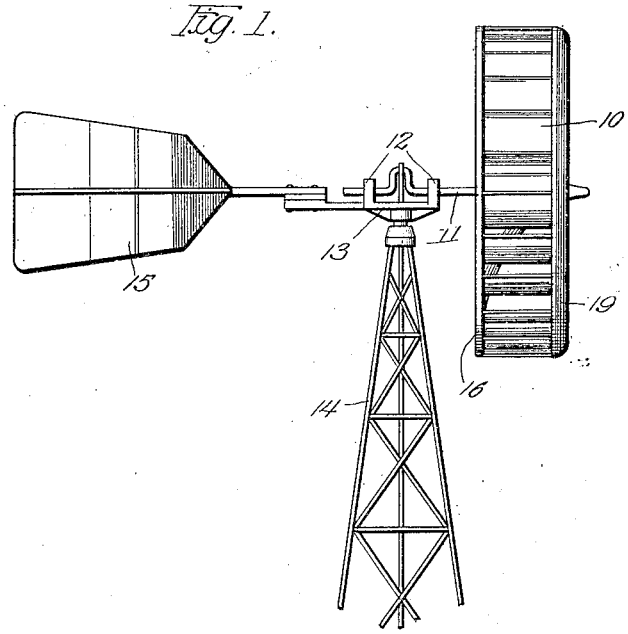
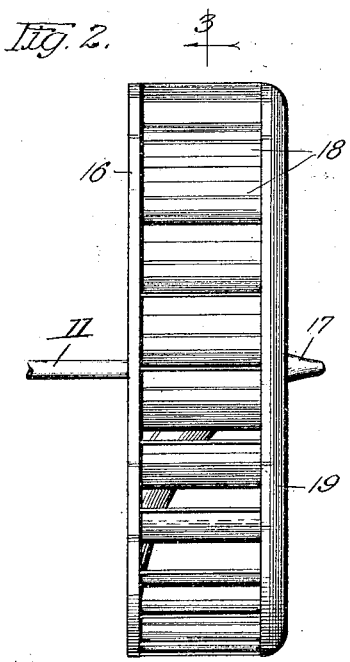
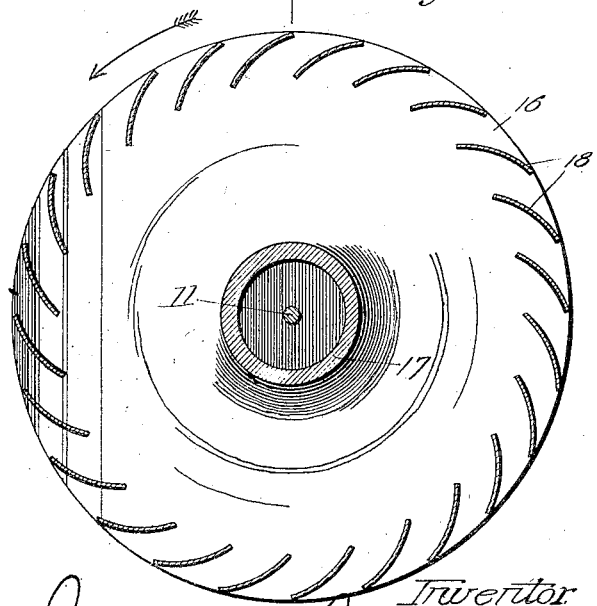

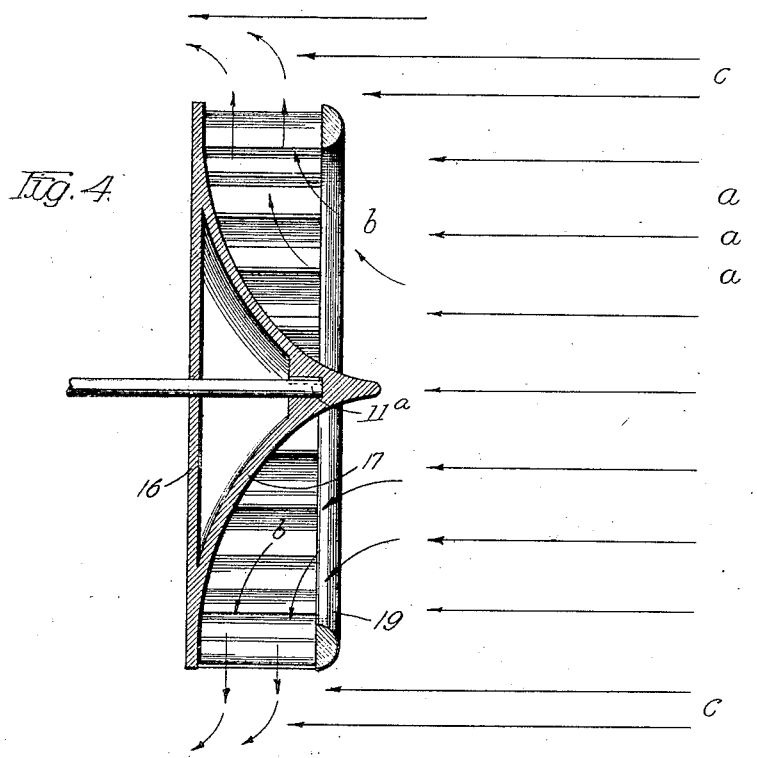
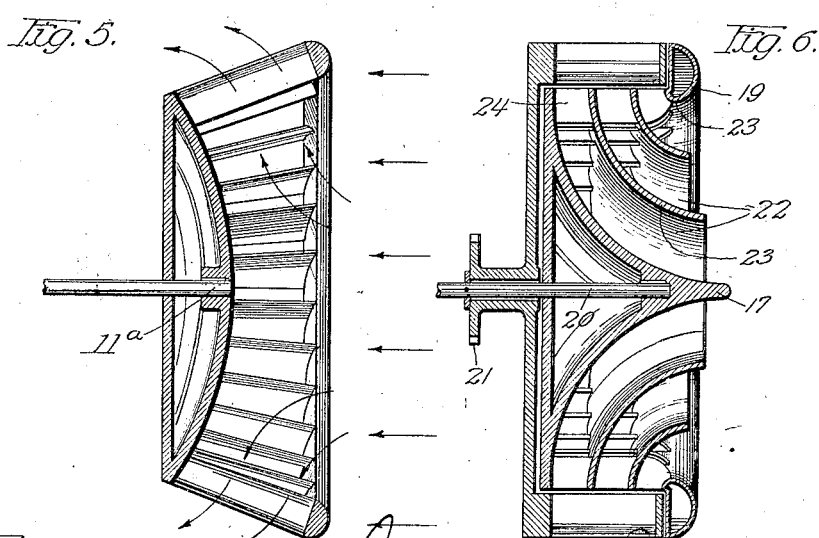

Patented Oct. 31, 1922.

1,433,995

UNITED STATES PATENT OFFICE.

FRANK F. FOWLE, OF WINNETKA, ILLINOIS.

TURBINE MOTOR.

Application filed August 17, 1918. Serial No. 250,280.

*To all whom it may concern:*

Be it known that I, FRANK F. FOWLE, a citizen of the United States, residing at Winnetka, in the county of Cook and State of Illinois, have invented certain new and useful Improvements in Turbine Motors, of which the following is a specification.

This invention relates to improvements in fluid motors, and more particularly to fluid motors of the turbine type.

One object of the invention is to improve the efficiency and usefulness of motors of this character, and, further, to provide improved means in connection therewith whereby more mechanical power may be developed from a wheel or turbine of given diameter than has hitherto been possible.

For purposes of illustration the present improvements will be shown and described herein as applied to turbine wind motors or windmills, but, as will be apparent from the following description, the construction and operation thereof and the principles upon which the invention is based render it equally applicable to fluid motors of all kinds, whether operated by gases or liquids, and accordingly the appended claims are intended to cover fluid motors generally, and not in a sense which will restrict or limit the invention to any of its particular adaptations.

Wind motors of the type now commonly employed may be described as axial-flow radial-blade turbines, which partially convert the energy of momentum of an air stream impinging thereon into mechanical power for the purpose of doing useful work, but such motors are relatively inefficient, by reason of defects which are inherent in their construction and mode of operation. In extracting the energy of momentum from the air stream and converting it into mechanical power it is necessary to reduce the velocity of the stream, and in order to extract all of the energy it would be necessary to reduce the velocity to zero, or bring the stream to a position of rest. That portion of the stream which impinges upon the motor and imparts thereto some portion of its energy of momentum is necessarily discharged from the motor at a velocity which is lower than its initial velocity. Since the velocity of discharge is lower than the initial velocity, it is obvious that the discharged stream, having no path of escape except one compelling it again to merge with the main stream body, must be accelerated by the action of the contiguous portions of the main stream until the whole again becomes a substantially homogeneous flowing mass.

In this type of wind motor, viz., the axial-flow radial-blade type of the character above referred to as now being in common use, the turbine is mounted upon a suitable rotatable shaft, the blades of said turbine being arranged with respect to said shaft and to each other in the usual manner; and, as is well known, the direction of the wind stream is substantially parallel to the axis of the turbine or windmill, and substantially perpendicular to the plane of rotation thereof. That portion of the wind stream which impinges upon the wheel acts upon the inclined blades, producing a resultant thrust or torque in the direction of rotation, thereby causing the wheel to rotate, with the result that the incident air stream as it passes through the wheel is lowered in velocity and discharged to the rear or behind said wheel. In the rear of the wheel the discharge therefrom mingles with the air vortices and eddies created by contiguous portions of the main stream, creating a region of turbulence, which gradually disappears in the direction of the stream flow, and finally merges in substantial homogeneous unity with the main wind stream. The region immediately behind the turbine wheel is therefore a region of reduced wind velocity and slightly lowered pressure, which causes contiguous portions of the main stream to be diverted into said region, such diversion taking the form of eddies or swirls which mingle with and as a whole impede the free discharge from the wheel. Furthermore, it is obvious that, regardless of such eddies, the discharge from the turbine wheel in this type of wind motor must be carried away by the suction of the main stream, or otherwise there would be an accumulation of the discharge in the region immediately behind the wheel, which would back up into said wheel, thereby obstructing its proper functioning. Even at best, any wind turbine of the axial-flow radial-blade type is relatively inefficient, for reasons among which the following are predominant:

(1) The discharge is parallel to the main stream, and must be gathered into the main stream again by suction, such suction being inherently of low efficiency and obstructed in a measure by cross currents and eddies;

(2) radial-blades of considerable length do not readily lend themselves to an efficient turbine design, because of the substantial difference in circumferential linear velocity between the outer and inner ends of each blade; (3) a substantial area in the region of the center of the wheel is virtually inactive and practically wasted; and (4) centrifugal action tends to throw the air out of the wheel, thus reducing its efficiency.

The present invention is characterized fundamentally in the provision of means whereby the turbine discharge is diverted directly into live portions of the contiguous fluid stream, to the end that the discharge itself is immediately scavenged in a positive manner by portions of the main stream which are contiguous to but do not impinge upon the turbine. This principle also renders it practical to embody collateral improvements in the construction of the turbine which tend to give it a relatively high efficiency.

Other objects and advantages of the invention will be apparent from the following description, taken in connection with the accompanying drawings, wherein several embodiments of the invention are illustrated:

Figure 1 is a side elevation of a tower showing a wind motor constructed in accordance with the present invention mounted in position thereon.

Fig. 2 is an enlarged side elevation of the turbine removed.

Fig. 3 is a section taken on the line 3—3 of Fig. 2.

Fig. 4 is a section taken on the line 4—4 of Fig. 3, arrows being employed to indicate the general path of travel of the air stream; and Figs. 5 and 6 are sectional views, similar to Fig. 4, illustrating slightly modified forms of the invention.

Referring more in detail to the drawings, wherein like reference characters are used to indicate like parts throughout, 10 designates my improved turbine motor as a whole, which is provided with a suitable rearwardly extending shaft 11, journalled in bearings 12, which may be of any preferred type, said bearings being mounted or supported upon the usual turn-table 13, which is rotatably mounted in any suitable manner on the tower or support 14. Rigidly secured to the turn-table, and projecting rearwardly therefrom, is a vane or tail 15, mounted in a substantially perpendicular plane containing the axis of the turbine, the function of said vane being to point the turbine into the wind, and to maintain it in such position at all times.

The turbine wheel or motor 10, which forms the subject-matter of the present improvements, comprises a rear disk or plate 16, which is mounted in any preferred manner on the shaft 11, near the outer end thereof, said disk providing a support for the wind deflector 17, which may be in the form of a concave cone having its base resting against the disk 16, and its axis coincident with the shaft 11, which may extend through the disk and be secured at its extreme outer end to said deflector adjacent its apex, as shown at 11ª. The deflector may be formed integral with the disk, if desired, as shown in the drawings, or it may be made separate and secured thereto in any suitable manner.

The disk 16 also provides a support for the blades 18 of the turbine wheel, said blades being secured to said disk at their inner ends in any suitable manner and to an annular front-retaining rim 19 at their outer ends, said rim not only serving to maintain said blades properly spaced apart and rigidly secured in position and against accidental displacement, but also providing in effect an air intake for said wheel, and with this in view said rim is preferably constructed in accordance with aero-dynamic principles, the front surface of said rim being of stream line design, as clearly illustrated in the drawings. The deflector 17, as will be noted from the above is so arranged that the same will cause the in-rushing air, admitted through the front opening or intake provided by the rim 19, to be deflected outwardly through the blades 18 in a substantially radial direction, as distinguished from the axial flow of the turbines heretofore referred to, and of the type now commonly employed.

The blades are preferably mounted perpendicularly on the disk 16, and substantially parallel to the shaft 11, and are so constructed and arranged that the radial flow of the air outwardly through said blades will act upon them in such a manner as to produce a torque or thrust, tending to rotate the turbine on its shaft in the direction of the arrow, Fig. 3. The mode of operation of this radial-flow parallel-blade fluid turbine is shown more clearly in Fig. 4 of the drawings, wherein the arrows $a$ indicate the normal fluid stream which passes into the turbine through its inlet, said stream impinging against the deflector 17, which causes it to swerve radially outwardly into the blades 18, as shown by the arrows $b$, and then to discharge radially into the contiguous portions of the main stream, which is indicated by the arrows $c$, said main stream acting automatically to carry away the discharge in a positive manner by direct impact and commingling. Eddies or swirls which form behind the wheel or behind the disk 16, it will be noted, will not impair or retard the discharge in any way, or interfere with the proper functioning of the turbine.

It it not necessary that the turbine blades should be parallel with the axis of the shaft 11. This will be more apparent by referring to Fig. 5 of the drawings, wherein the blades are shown flared slightly outwardly, or in the direction of the intake. The principle of action and operation of this modified form of the invention, however, is substantially the same as that described in connection with the preferred embodiment. Neither is it necessary to construct the wind deflector 17 as shown in the figures illustrating the first form of the invention herein disclosed, wherein it is shown as of concave cone design, with its base on the disk 16 and its axis coincident with the shaft 11; but, on the other hand, said deflector may take a variety of forms, among others the one shown in Fig. 5 of the drawings. As will be noted by reference to this figure the deflector 17 is therein shown as the segment of an ellipsoid symmetrical with respect to the shaft 11 as axis. As above stated, it is within the contemplation of the present improvements to construct the deflector of various other forms, should it be found desirable.

In Fig. 6 of the drawings another modified form of the invention is illustrated, wherein the turbine wheel is shown loosely mounted on a stationary shaft 20, to which the deflector 17 is fixed. Any suitable means may be provided for transmitting the power developed by the wheel to the mechanism to be driven, a gear wheel 21 being shown in the drawings for this purpose. In this form of the invention there is provided a plurality of air passages 22 adapted to distribute the inrushing air uniformly throughout the blade lengths. These air passages are shown in the drawings formed by a plurality of spaced apart plates 23, disposed concentrically relative to the deflector 17, and so constructed and arranged as to discharge the air passing therebetween against the blades 18 of the turbine wheel at various points throughout their lengths. These plates are shown in the drawings as being secured together and to the deflector by means of suitable vanes 24, which are designed to direct the air into the blades 18 of the rotor at the proper angle. The rim 19 in this embodiment of the invention is also of stream line design, and may be formed by curving the outermost plate 23 back on itself as shown more clearly in the drawings.

It will be readily apparent from the foregoing that the present improvements are susceptible of many changes and modifications other than those herein illustrated and described, and accordingly it is not desired to restrict the invention to the embodiments shown, such embodiments having been selected merely for purposes of illustration.

From the above it will be noted that a fluid turbine has been provided wherein the discharge is directed substantially at right angles into the contiguous portions of the main wind stream which do not impinge directly upon the turbine, thereby securing a positive removal or scavenging of the discharge; that the blades of the turbines are so disposed and arranged that all portions thereof are adapted to move at substantially the same circumferential linear velocity, thereby securing more uniform efficiency from all portions of the blades, and overcoming one of the objections to the use of radial blades of considerable length; and, further, that a turbine wheel has been provided wherein the blades are disposed at substantially the outer circumference thereof, whereby relatively high torque may be obtained. It will also be noted from the foregoing that a fluid motor has been designed, the efficiency of which is not impaired by centrifugal action, as in the axial-flow radial-blade type of wheel, wherein the proper and efficient functioning of the blades is interfered with by such action.

An additional and very important feature of the present improvements, as will be apparent, resides in the provision of means whereby all of the wind stream which impinges upon the turbine is deflected into the blades, thereby overcoming one of the objections above named to the type of wind mill now in common use.

It is not desired to restrict or limit the present invention, except where limitations appear in the appended claims.

I claim:—

1. The improved method of operating fluid turbines, which consists in deflecting the propelling current into the blades only at substantially right angles to the main stream flow, and utilizing the contiguous portions of said main stream which are not intercepted by the turbine to scavenge the discharge or remove the same in a positive manner.

2. In a fluid turbine, the combination of a shaft disposed substantially parallel to the direction of stream flow, a plurality of substantially parallel blades disposed circumferentially about said shaft, means for deflecting into said blades substantially at right angles thereto and for distributing throughout their lengths the portion of the fluid stream intercepted by said turbine, and means covering only the front edges of said blades and the circumferential spaces therebetween to prevent axial flow of fluid between said blades and to facilitate the scavenging action of fluid flowing past said turbine.

3. An air motor, comprising a rotor having a shaft substantially parallel to the current flow, a disk mounted on said shaft, blades attached endwise to said disk near the circumference thereof, a ring substantially concentric with said shaft and attached to the opposite ends of said blades and constituting an intake for said air motor, the outer surface of said ring being coincident with the outer surfaces of said blades to prevent an eddying action radially outwardly from said blades, and means for guiding the current received by said intake to said blades and for discharging the same angularly into contiguous portions of the current not intercepted by said intake.

4. The combination with a tower of a horizontal shaft, a vertical pivotal support therefor on said tower and a substantially cylindrical rotor supported by said shaft in front of said pivotal support, said rotor comprising blades substantially parallel to the stream flow, a ring secured to the front of said blades and of a diameter no greater than the diameter of the outer blade edges for guiding the stream flow not passing between the blades from eddying radially outwardly therefrom, and a curved conical deflector extending forwardly from the rear ends of said blades.

5. A fluid turbine comprising a fluid receiving body the entire front of which is open and unobstructed, a plurality of circumferentially arranged blades lying parallel to the direction of stream flow and forming the radially outer confines of said body, one portion of said body being shaped for deflecting into said blades substantially at right angles thereto the fluid stream intercepted by said turbine, and means covering only the front edges of said blades and the circumferential spaces therebetween to prevent axial flow of fluid between said blades and to facilitate the scavenging action of fluid flowing past said turbine.

In testimony whereof, I have subscribed my name.

FRANK F. FOWLE.